United States Patent [19]

McKernan et al.

[11] Patent Number: 4,766,665

[45] Date of Patent: Aug. 30, 1988

[54] METHOD FOR MACHINING PARTS MADE OF TUNGSTEN AND OF TUNGSTEN WITH THORIA

[75] Inventors: Bernard J. McKernan, Wysox; Richard G. Burke, Towanda; Phillip D. Wurzler, Laceyville, all of Pa.

[73] Assignee: GTE Products Corporation, Stamford, Conn.

[21] Appl. No.: 95,209

[22] Filed: Sep. 11, 1987

[51] Int. Cl.⁴ .................. B23P 13/04; B23C 3/00; B23B 35/00; B23B 1/00

[52] U.S. Cl. ........................... 29/557; 82/1 C; 408/1 R; 409/132

[58] Field of Search ............ 29/557, 558, 157 C, 29/419 R; 409/131, 132, 136, 249, 294; 82/1 C, 12, 1 R; 407/119, 113; 408/1 R, 144, 56; 428/627, 569, 552; 378/144, 143; 51/266, 267, 308

[56] References Cited

U.S. PATENT DOCUMENTS

| | | | |
|---|---|---|---|
| 3,145,529 | 8/1964 | Maloof | 428/569 |
| 3,570,332 | 3/1971 | Beake | 82/1 C |
| 4,227,842 | 10/1980 | Samanta et al. | 409/131 |
| 4,286,905 | 9/1981 | Samanta | 409/132 |
| 4,341,834 | 7/1982 | Kikuchi et al. | 428/627 X |
| 4,563,114 | 1/1986 | Casstevens | 408/1 R X |
| 4,587,174 | 5/1986 | Yoshimura et al. | 428/552 |
| 4,708,037 | 11/1987 | Buljan et al. | 82/1 C |

FOREIGN PATENT DOCUMENTS

| | | | |
|---|---|---|---|
| 209705 | 11/1984 | Japan | 82/1 C |
| 8502798 | 7/1985 | PCT Int'l Appl. | 29/557 |
| 172389 | 8/1960 | Sweden | 428/569 |
| 487737 | 12/1975 | U.S.S.R. | 408/144 |
| 1144798 | 3/1985 | U.S.S.R. | 408/1 R |

*Primary Examiner*—William R. Briggs
*Attorney, Agent, or Firm*—Donald R. Castle; L. Rita Quatrini

[57] ABSTRACT

A method is disclosed for shaping parts made of tungsten and of tungsten with thoria. The method involves machining the parts with a machining apparatus wherein the machining tool is made of diamond or material of which tungsten carbide is the main phase, the material having a hardness of greater than about 91 Rockwell A, the machining being done at a speed of from about 40 to about 120 surface feed per minute, and a feed rate of from about 0.0002 to about 0.006 inches per revolution. Machining of parts made of tungsten is done with cooling with a halocarbon solvent. Machining of parts made of tungsten and thoria can be done with or without cooling.

15 Claims, No Drawings

METHOD FOR MACHINING PARTS MADE OF TUNGSTEN AND OF TUNGSTEN WITH THORIA

This invention relates to methods for machining parts made of tungsten and of tungsten with thoria. More particularly, the method involves machining the parts with a machining tool made of diamond or tungsten carbide which has a high hardness, the machining being done at a specific speed and feed rate combination using a special type of coolant when a coolant is needed.

BACKGROUND OF THE INVENTION

In the machining of parts made of tungsten or thoriated tungsten, the machining tools are subjected to wear to such a degree that there is no size control in the machined part and the tools erode. The quality of the part is therefore inferior as far as the size control and also in the surface finish.

Therefore, a method to machine tungsten parts which is economical and which results in good size control and good surface finish would be highly desirable and an advancement in the art.

SUMMARY OF THE INVENTION

In accordance with one aspect of this invention there is provided a method for shaping parts made of tungsten and of tungsten with thoria. The method involves machining the parts with a machining apparatus wherein the machining tool is made of diamond or material of which tungsten carbide is the main phase, the material having a hardness of greater than about 91 Rockwell A, the machining being done at a speed of from about 40 to about 120 surface feet per minute, and a feed rate of from about 0.0002 to about 0.006 inches per revolution. Machining of parts made of tungsten is done with a halocarbon solvent as coolant. Machining of parts of tungsten with thoria can be done with or without cooling.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a machining method for parts made of tungsten and of tungsten with thoria. The method involves use of a high strength and hardness machining tool which is made of a special type material which can be diamond or a material of which tungsten carbide is the main phase, in combination with a specific set of speed and feed rate parameters. Also, if cooling is necessary as is the case when the part is made of pure tungsten, the coolant is a halocarbon solvent which can be a chlorocarbon, a fluorocarbon or a combination of these. Most preferred of these is perchloroethylene.

The parts to be shaped by machining are made of pure tungsten or tungsten with thoria. With the thoriated tungsten, the thoria makes up typically from about 1% to about 2% by weight of the material.

The machining apparatus can be essentially any such apparatus, such as lathes, milling machines, or combinations thereof.

The shaping or machining can be essentially any type such as drilling, boring, turning, facing, or milling. The invention is not to be limited to any specific type of machining as it is applicable to machining parts of pure tungsten and tungsten with thoria. For example, in the manufacture of small electrodes for the welding industry and contactors for electronic applications, parts of tungsten having about 2% by weight thoria are machined. The machining requires small chamfers or tapered outside machining.

The material of the tool which is used can be either diamond or material of which tungsten carbide is the main phase. The diamond can be synthetic diamond or natural industrial diamond. It is critical that whatever the specific composition of the material, especially with respect to the tungsten carbide, that the hardness or strength of the material be greater than about 91 Rockwell A, and most preferably at least about 92.8 Rockwell A. One especially preferred tungsten carbide material is manufactured by GTE Valenite and has the designation VC 29.

It is critical to the practice of the present invention that the speed of the lathe spindle be from about 40 to about 120 surface feet per minute and preferably from about 60 to 90 surface feet per minute. A speed which is too slow results in wear of the cutting edge of the tool. A speed which is too fast results in too much pressure on the tool causing it to shatter.

It is also critical that the feed rate of the part be from about 0.0002 to about 0.006 inches per revolution, and preferably from about 0.0004 to about 0.001 inches per revolution.

In some machining operations, a coolant is required for the part. This is true when the part is made of pure tungsten. When the part is made of tungsten with thoria, cooling may or may not be necessary.

The following non-limiting examples serve to illustrate some specific applications in which the method of the present invention is especially suited.

EXAMPLE 1

In this example, 10 parts are machined to put a taper on one end of parts made of pure tungsten. Because of the hard and abrasive characteristics of the metal, compact diamond tool is chosen for metal removal. The tool is mounted into the hydraulic tracer attachment mounted on a Hardinge HLVH tool room lathe. The part is flooded with perchloroethylene coolant. The variable spindle is set at an approximate speed of 350 rpm which results in turning at 42 surface feet per minute (SFPM) at the small end of the taper and 67 SFPM at the large end. To measure tool wear, actual diameters are checked at two lengths of 1.2" and 1.6" from opposite face. All parts are machined using a 0.002" per revolution feed rate. Resetting of the tool to assure constant cutting depth for each pass does not occur but all parts stop at the same zero setting. After machining and checking, it is concluded that tool wear does occur causing the part to be progressively larger at both diameters and does appear to be constant, so required compensation for tool wear can be predicted, whereas in prior art tools, the wear is so great that the size of the part is unpredictable.

EXAMPLE 2

The RPM is 352 and the coolant is perchloroethylene. A ¼" diameter solid carbide circuit board drill is used mounted in a drill chuck. The parts are drilled with the same drill with a feed rate of 0.001" per revolution. The average size of drilled hole for 10 parts is 0.2494 with a sample deviation of 0.00021. Runout from I.D. to O.D. is checked on the same parts and found to have an average of 0.00046 with a sample deviation of 0.00025. This test shows that it is possible in a standard lathe to machine the parts as far as the machine's capability allows.

EXAMPLE 3

In this example, tungsten with about 2% by weight thoria parts are used. The primary goal is to remove metal from the inside and outside diameters, and the secondary goal is to groove the inside diameter of the machined parts.

Starting part sizes: 5" OD × 1.72" thick
Machined part sizes: Funnel shaped, 4.162 D at large end, 1.360" thick with a 2.125" D hole through, also funnel shaped.

From rough to finish dimensions, about 23 cubic inches of metal are removed. Three operations are necessary to do this job satisfactorily. Also included in this testing is the grooving operation on the inside diameter of the finished part.

The machining is done in a Mori-Seiki CNC lathe, Model SL3H, using Encut #98363 from Engineered Lubricants, and Encut #975 (5 gallons) with about 20% perchloroethylene coolant added to it.

The first operation faces 0.150" off the part, drills 1.812" diameter virtually through, bores the ID to 2.038" and turns the OD for a tooling diameter of 3.750"±0.002. The facing tool is VC2 grade tungsten carbide having a hardness of less than about 91 Rockwell A. This SPG-422 insert shows appreciable tool wear after the first pass across the part. This surface finish is very rough compared to surfaces machines with VC29. The first and second operations are outlined in Tables 1 and 2 respectively.

Interrupted cuts prove to be detrimental to any tool life.

These operations show that thoriated tungsten can be successfully machined.

TABLE 1

Machining Test Outline of Tungsten with 2% By Weight Thoria First Operation - SL3H Lathe

| Tool No. | Description of Operation | Amount of Metal Removed | Surface Speed | Comments |
|---|---|---|---|---|
| 1 | Facing TL - SPG-422, VC2 | 3.0 cu" | 200 SFM* | Rough Finish |
| 3 | 1.812 Valenite Drl-VC2 | 4.12 cu" | 210 rpm | No significant Problem |
| 5 | 1"D boring bar TPG-321 VC29 | 1.0 cu" | 200 SFM | Some roughness in finish |
| 8 | Rough turn - TPG-322, VC29 | 3.5 cu" | 200 SFM | Good finish heat created |
| 10 | Finished turn - TEC-321, VC29 | .5 cu" | 200 SFM | Good finish |

*Surface feet/min.
Feed rate .0035 "/revolution of spindle

TABLE 2

Machining Test Outline of Tungsten with 2% By Weight Thoria Second Operation - SL3H Lathe

| Tool No. | Description of Operation | Amount of Metal Removed | Surface Speed | Comments |
|---|---|---|---|---|
| 1 | Facing TL - SPG-422, VC2 | 4.0 cu" | 200 SFM* | Rough And Torn finish |
| 3 | Boring bar - TPG-321, VC29 | 1.0 cu" | 200 SFM | Good finish |
| 5 | Boring bar TPG-321, VC29 | | | Did not run |
| 8 | Rough turn - TPG-322, VC29 | | | Did not run |
| 10 | Finished turn - TEC-321J, VC29 | | | Did not run |
| 7 | .038" Grooving TL-VC29 This test refers to the grooving of the above machined parts | .3 cu" | 75 SFM | Machined 3 grooves |

*Surface feet/min.
Feed rate .0035"/revolution of spindle

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for shaping tungsten parts, said method comprising machining said parts with a machining apparatus wherein the machining tool is made of material selected from the group consisting of diamond, and material of which tungsten carbide is the main phase, said material having a hardness of greater than about 91 Rockwell A, said machining being done at a speed of from about 40 to about 120 surface feet per minute and a feed rate of from about 0.0002 to about 0.006 inches per revolution, said part being cooled by a halocarbon solvent.

2. A method of claim 1 wherein said machining tool is made of material of which tungsten carbide is the main phase.

3. A method of claim 1 wherein said tool is made of diamond.

4. A method of claim 1 wherein the hardness of said tool is greater than about 92.8 Rockwell A.

5. A method of claim 1 wherein the speed is from about 60 to about 90 surface feet per minute.

6. A method of claim 1 wherein the feed rate is from about 0.0004 to about 0.001 inches per revolution.

7. A method of claim 1 wherein said solvent is perchloroethylene.

8. A method for shaping parts, said parts being made of material consisting essentially of tungsten as the main phase, and thoria, said method comprising machining said parts with a machining apparatus wherein the machining tool is made of material selected from the group consisting of diamond, and material of which tungsten carbide is the main phase, said material having a hardness of greater than about 91 Rockwell A, said machining being done at a speed of from about 40 to about 120 surface feet per minute and a feed rate of from about 0.0002 to about 0.006 inches per revolution.

9. A method of claim 8 wherein said machining tool is made of material of which tungsten carbide is the main phase.

10. A method of claim 8 wherein said tool is made of diamond.

11. A method of claim 8 wherein the hardness of said tool is greater than about 92.8 Rockwell A.

12. A method of claim 8 wherein the speed is from about 60 to about 90 surface feet per minute.

13. A method of claim 8 wherein the feed rate is from about 0.0004 to about 0.001 inches per revolution.

14. A method of claim 8 wherein during said machining, said part is cooled by a halocarbon solvent.

15. A method of claim 14 wherein said solvent is perchloroethylene.

* * * * *